United States Patent [19]

Coleman et al.

[11] Patent Number: 4,640,837

[45] Date of Patent: Feb. 3, 1987

[54] COATING COMPOSITION FOR MICROWAVE COOKING

[75] Inventors: Edward C. Coleman, Cranbury; Jeffrey D. Wagner, Imlaystown; Donna J. Ballard; Catharine E. Stone, both of East Windsor; Nancy A. Swallow, Plainsboro; Nancy L. Carey, Erial, all of N.J.

[73] Assignee: General Foods Corporation, White Plains, N.Y.

[21] Appl. No.: 786,985

[22] Filed: Oct. 15, 1985

[51] Int. Cl.$^4$ .............................................. A23L 1/176
[52] U.S. Cl. ........................................ 426/94; 426/96; 426/99; 426/93; 426/289; 426/302; 426/307; 426/653
[58] Field of Search ...................... 426/92, 96, 94, 99, 426/289, 302, 653, 93, 307

[56] References Cited

U.S. PATENT DOCUMENTS

| | | | |
|---|---|---|---|
| 3,586,512 | 1/1971 | Mancuso | 426/289 |
| 3,843,827 | 10/1974 | Lee et al. | 426/293 |
| 3,852,501 | 12/1974 | Fazzina et al. | 426/293 |
| 4,199,603 | 4/1980 | Sortwell | 426/92 |
| 4,208,442 | 6/1980 | Evans | 426/92 |
| 4,252,832 | 2/1981 | Moody | 426/241 |
| 4,496,601 | 1/1985 | Rispoli | 426/289 |
| 4,518,618 | 5/1985 | Hsia et al. | 426/243 |
| 4,529,607 | 7/1985 | Lenchin | 426/94 |

Primary Examiner—Jeanette Hunter
Attorney, Agent, or Firm—Sam D. Walker; Thomas R. Savoie; Daniel J. Donovan

[57] ABSTRACT

A coating composition for imparting a crisp, golden-brown surface to foodstuffs cooked in a microwave comprising a bread crumb/oil blend in amounts up to 66% by weight of the composition, maltodextrin, soy protein concentrate and pre-gelatinized starch. The bread crumbs and oil are first baked at 260° F. for 15 minutes, followed by the addition of the maltodextrin, soy protein concentrate, and pre-gelatinized starch. The combination is then mixed until a uniform blend is achieved.

18 Claims, No Drawings

COATING COMPOSITION FOR MICROWAVE COOKING

FIELD OF THE INVENTION

The present invention is concerned with a coating composition for foods which produce a crisp coat when cooked. More particularly, the present invention is concerned with a coating composition which produces a crisp, golden-brown coating when applied to foodstuffs and cooked in a microwave.

BACKGROUND

Many foods such as poultry, meat, fish and vegetables are coated with a light coating of flour or bread crumbs which on frying in oil develops a characteristic crispy, brown-colored coating. However, the messiness involved with the preparation of fried foods, the ever present danger of spattering oil, and the unfavorable dietary aspects associated with fried foods have led to the development of coatings which attempt to impart a fried appearance to a foodstuff which is baked and with the appealing color, taste, and texture associated with fried foods.

U.S. Pat No. 3,586,512 by Mancuso et al. and U.S. Pat. No. 3,843,827 by Lee et al. both prepare a baked comestible with a fried texture and appearance. The Mancuso et al. patent does this by providing a dye system which changes color during cooking, while the Lee et al. patent does this by providing a unique batter formulation and dry-mix coating. Other coatings have been developed for foodstuffs for the same purpose, i.e., to provide a baked food with a surface similar in appearance, color and texture to that of coated, deep, fat-fried foods, such as U.S. Pat. No. 3,852,501 by Fazzina et al. However, these coatings rely on high levels of shortening to obtain the desired results.

In recent years, a number of products have been developed and marketed for coating foods prior to baking or frying. Their purpose is to produce the desirable crisp, browned coating. Such products have found considerable market acceptance, especially for the preparation of baked foods which resemble fried foods in appearance and crispness, but avoid the use of oil and other fats. These products work quite well in conventional ovens. However, when used in the recently developed microwave cooking appliances, the resulting product leaves much to be desired.

Since the heat energy in microwave is released internally within the food, the surface remains at a relatively even temperature with the interior. Whereas, in conventional cooking, the external temperature (surface) of the foodstuff far exceeds the internal temperature. Therefore, in microwave cooking the high surface temperatures necessary to achieve browning, dehydration and crisping are never achieved since the internal moisture migrates to the food surface affecting crisping and browning on the surface of the foodstuff.

In an attempt to overcome these problems, the appliance manufacturers have resorted to including radiant browning elements within the microwave chamber. Food coating merchandisers often include brown coloring components in the coating mixers to artificially brown or golden color the food surface. This, however, does not solve the problem of suface crispness.

A further attempt was disclosed in U.S. Pat. No. 4,518,618 by Hsia wherein a food coating composition having an ability to produce crisp, brown coatings on food products cooked in microwave ovens was developed. In Hsia, the coating ingredients in combination with salts, such as potassium acetate, potassium chloride and potassium bicarbonate; or potassium acetate, potassium chloride, and sodium bicarbonate produced a crisp-brown coating.

U.S. Pat. No. 4,529,607 by Lenchin discloses a batter composition for the preparation of batter coated prefried microwavable foodstuff. In Lenchin a batter mix containing an effective amount of amylase flour is cooked in hot fat or cooking oil, and subsequently cooked to completion by means of microwaving. It is important to note that the batter in Lenchin is coated onto raw chicken and baked. The baked product is then frozen.

The present invention is concerned with an improved, food-coating mix which will produce a crisp, golden-brown, dehydrated surface coating on food products cooked in a microwave appliance without the addition of salts or high amylose flour.

The object of the present invention is, therefore, to provide an improved coating composition which will produce a crisp, golden-brown coating on foodstuff when cooked in a microwave appliance.

SUMMARY OF THE INVENTION

The present invention is concerned with a food coating composition for imparting a crisp golden-brown surface to food which comprises: bread crumbs in amounts ranging from 40 to 90% by weight; malto dextrin in amounts ranging from 5 to 20% by weight; pre-gelatinized starch in amounts ranging from 5 to 20% by weight; and soy protein concentrate in amounts ranging from 2 to 20% by weight, said composition having an oil content ranging from 15% to 24% by weight, and wherein when applied to the surface of a foodstuff and cooked in a microwave appliance, a finished product having a crispy, golden-brown surface is produced.

Further, the present invention is concerned with a process for preparing a coating composition which imparts a crisp golden-brown surface on foods cooked in a microwave appliance comprising, contacting bread crumbs with oil and mixing to form a uniform blend; heating the uniform blend for from 10 to 20 minutes at from 220° F. to 260° F., and combining the heated uniform blend with malto dextrin, pre-gelatinized starch and soy protein concentrate and mixing the combination to form a uniform mixture for packaging.

DETAILED DESCRIPTION

The present invention discloses a coating composition of specially processed bread crumbs, protein, starches, dextrin and spices that deliver a crisp, golden-brown coating for foods cooked in a microwave appliance.

The bread crumbs in the present invention are combined with oil or fat and mixed to form a uniform bread crumbs/oil blend. The levels of the bread crumb/oil blend in the coating composition should generally range from 40 to 90% by weight and preferably from 60 to 70% by weight of the total coating composition. The bread crumbs may be of a formulation and may be processed by any means common in the art, but preferably for optimum crispness Japanese bread crumbs are employed. What is meant by Japanese bread crumbs is that the bread crumbs consist essentially of wheat flour, yeast, salt, and have an elongated, porous and striated shape and structure. Other ingredients such as seasonings, shortening, milk solids, sugar, minor amounts of other flours (e.g. rice, barley, soy, etc.), whey solids, etc. may also be added to the Japanese bread crumb formulation. Broadly, the bread crumbs used in this invention have a particular size wherein at least 15% by weight of the crumbs or fines are retained on a U.S.S. 10 mesh screen, and at least 70% by weight of the crumbs or fines are retained on a U.S.S. 14 mesh screen.

The dextrin and starch used in the present invention act as a binding agent when the composition is applied to foods. The amount of dextrin in the formulation should range from 5 to 20% by weight and preferably from 8 to 12% by weight, and the amount of starch should range from 6 to 20% by weight and preferably from 9 to 13% by weight. The starch and dextrin together act as a binding system aiding uniform coating and adhesion of the coating composition to the foodstuff as well as promoting crispness development. The dextrin employed should have a dextrose equivalent (DE) within the range of 5–20 which includes malto dextrins.

The starch used in the present invention is of the pre-gelatinized variety. For example, a modified pre-gelatinized starch which is film forming and of low viscosity such as an acetylated pre-gelatinized waxy-maize starch is preferred.

The coating composition also contains a protein. The amount of protein should generally range from 2 to 20% by weight of the composition and preferably from 3 to 6% by weight. The protein may be sodium caseinate, soy protein concentrate, egg albumin or combination thereof, with soy protein concentrate being the preferred.

The amount of oil in the final composition should generally range from 15 to 24% by weight and preferably 17 to 21% by weight of the coating composition.

Further, the coating composition may also contain residual ingredients such as flavoring, coloring, processing aids as well as preservatives. Generally, these residual ingredients comprise of salt at levels ranging from 1 to 5% by weight, seasoning (e.g., pepper, garlic powder, sugar, onion powder, monosodium glutamate, etc.) at levels ranging from 1 to 6% by weight, processing aid such as silicon dioxide (flow agent) at levels ranging from 0.05 to 2.0% by weight, and coloring agents such as paprika, FD&C approved colors, beet powder, annatto, tumeric, etc. at levels ranging from 0.01 to 2.0% by weight, all percentages being by weight of the total coating composition.

In order to produce the novel coating of the present invention wherein a crisp, golden-brown surface is produced on a foodstuff cooked in a microwave appliance, the ingredients of the present invention have to be processed in a particular manner.

The first step in processing the ingredients involves contacting the bread crumbs with oil and mixing same to form a uniform blend. This is accomplished by adding the oil to a ribbon blender containing bread crumbs and mixing for from 2 to 5 minutes. The amount of bread crumbs should preferably range from 66 to 76% by weight of the blend. The oil should range from 24 to 34% by weight of the blend and preferably from 26 to 30% by weight. Oil in the present invention includes vegetable oils as well as animal fat. Vegetable oils predominately glycerol fatty acid esters are extracted from a variety of plant seeds, nuts, beans and fruits. Sources of vegetable oil are soybean, cotton seed, peanut, corn germ, olive, coconut, sesame, sunflower seed, cocoa beans and the like. Animal fats are generally obtained by processing the fatty tissue of hogs, cattle or fowls.

The bread crumb/oil blend is then baked for a period of time ranging from 5 to 50 minutes and preferably from 10 to 25 minutes at a temperature ranging from 220° F. to 260° F. and preferably from 240° to 250° F. During the baking process, the protein present in the bread crumbs is completely denatured and forms an aggregated protein complex which is less prone to pick up moisture in a cool, moist microwave environment. Also, during baking the starch fraction becomes completely gelatinized. The formation of an aggregated protein complex affect the functionality of the final product, in that, it decreases the amount of moisture absorbed or picked up by the blend. This minimum amount of moisture that is pickedup tends to be in a bound state and not on the surface of the baked crumbs, hence enhancing crispness.

Optionally, the bread crumbs may be fried instead of baked. However, pior to frying, the mositure of the crumbs must be increased. This is accomplished by adding sufficient water to raise the moisture of the crumbs to between about 30% and 40%. The moistened bread crumbs are then fried at temperatures ranging from 350° to 400° F. for from 30 seconds to about 2 minutes. The fried crumbs are then drained to an oil content of 25% to 30%. The resulting crumbs exhibit characteristics similar to baked crumbs.

Baking may be accomplished by any conventionally known baking means. However, baking is preferably accomplished in a continuous manner wherein a continuous gas fired dryer is utilized.

The baked bread crumb/oil blend has a moisture content ranging from 0.1 to 2.0% of the blend and an oil content ranging from 24 to 34% of the blend. The baked bread crumb/oil blend is then combined with the other dry ingredients, such as maltodextrin, pre-gelatinized starch, seasonings, soy protein concentrate and ground paprika, and mixed for from 15 to 20 minutes or until a uniform mixture is achieved. The baked bread crumb/oil blend comprises at least 66% of the total composition while the other dry ingredients makeup the remaining 34%.

Each dry component plays a specific role in the final product functionality. For instance, the maltodextrin aids in the adhesion process, the pre-gelatinized starch affects film forming capabilities and adhesion, while the soy protein concentrate enhances crispness and film-forming capabilities. The coating composition is applied to the foodstuff by first moistening the surface of the foodstuff and then coating the moistened foodstuff with the coating composition by any means common in the art. Such common means include applying the coating composition to the moistened foodstuff in a closed bag containing the composition, or simply covering the moistened foodstuff with the coating composition.

After the coating step, the coated foodstuff is then placed in a microwave appliance and baked until done. The resultant baked foodstuff is found to have a uniform, crisp, golden-brown and adherent coating with the taste, texture and appearance as if it was baked in a conventional oven or pan fried.

Appropriate foodstuff includes chicken pieces, chicken cutlets, chicken nuggets, fish fillets or vegetable strips or the like. However, best results are obtained when skinless chicken is utilized.

The following examples illustrate facets of the invention. It should be understood, however, that these examples are merely meant to be illustrative and the invention is not to be limited thereto.

EXAMPLE I

A food coating composition was prepared by first combining 72% Japanese bread crumbs with 28% vegetable oil. The combination was mixed in a ribbon blender for 4 minutes. The bread crumb/oil blend was then baked in a continuous hot air oven for 15 minutes at 250° F.

Sixty-six percent (66%) of the baked bread crumb/oil blend was combined with 11% pregelatinized starch, 10.5% maltodextrin, 4.2 soy protein concentrate, 2.5% salt, 5.4% flavor and 0.4% paprika in a ribbon blender and mixed for 20 minutes. The resulting composition when applied to moistened skinless chicken pieces and cooked/baked in a microwave appliance produces a cooked, golden-browned product with crisp coatings.

EXAMPLE II

A food coating composition was prepared by first combining 72% Japanese bread crumbs with 28% vegetable oil. The combination was mixed in a ribbon blender for 4 minutes. The bread crumb/oil blend was then baked in a continuous hot air oven for 15 minutes at 250° F.

Seventy-five percent (75%) of the baked bread crumb/oil blend was combined with 6% pregelatinized starch, 6% tapioca dextrin, 6% soy protein concentrate, 3% salt, 3.5% flavor and 0.5% paprika in a ribbon blender and mixed for 20 minutes. The resulting composition when applied to moistened, skinless chicken pieces and fish and cooked/baked in a microwave appliance produces a cooked, golden-brown product with a crisp coating.

EXAMPLE III

A food coating composition was prepared by adding to a mixer containing 2,000 grams of Japanese bread crumbs, 600 grams of water. The combination was mixed to form a uniform blend having a moisture of about 35%. The moistened bread crumbs were then deep-fat dried for 30 seconds at 350° F. The fried bread crumbs were then drained until the fat content reached 28%.

Sixty-six percent (66%) of the fried bread crumbs were combined with 11% pregelatinized starch, 10.5% maltodextrin, 4.2 soy protein concentrate, 2.5% salt, 5.4% flavor and 0.4% paprika in a ribbon blender and mixed for 20 minutes. The resulting composition when applied to moistened skinless chicken pieces and cooked/baked in a microwave appliance produces a cooked, golden-brown product with crisp coatings.

We claim:

1. A food coating composition for imparting a crisp, golden-brown surface to foodstuff cooked in a microwave appliance comprising: a blend of bread crumbs and oil wherein the amount of bread crumbs in the blend ranges from 66 to 76% by weight of the blend and the amount of oil in the blend ranges from 24 to 34% by weight of the blend; and the amount of bread crumb/oil blend in the composition ranges from 40 to 90% by weight; dextrin in amounts ranging from 5 to 20% by weight of the composition; pre-gelatinized starch in amounts ranging from 5 to 20% by weight of the composition; and soy protein concentrate in amounts ranging from 2 to 20% by weight of the composition, said composition having a total oil content ranging from 15 to 24% by weight.

2. A food coating composition according to claim 1 wherein the amount of bread crumbs/oil blend in the composition range from 60 to 70% by weight.

3. A food coating composition according to claim 2 wherein the amount of bread crumbs/oil blend in the composition is about 66%.

4. A food coating composition according to claim 1 wherein the amount of dextrin ranges from 8 to 12% by weight of the composition.

5. A food coating composition according to claim 1 wherein the amount of pre-gelatinized starch ranges from 9 to 13% by weight.

6. A food coating composition according to claim 1 wherein the amount of soy protein concentrate ranges from 3 to 6% by weight.

7. A food coating composition according to claim 1 wherein the amount of oil in the composition ranges from 17 to 21% by weight.

8. A process for preparing a coating composition which imparts a crisp, golden-brown surface on foods cooked in a microwave appliance comprising:
   (a) contacting bread crumbs with oil and mixing to form a uniform blend wherein the amount of bread crumbs in the blend ranges from 66 to 76% by weight of the blend and the amount of oil in the blend ranges from 24 to 34% by weight of the blend;
   (b) heating the uniform blend for from 5 to 50 minutes at from 220° F. to 260° F.; and
   (c) combining the heated uniform blend with a mixture comprising dextrin in amounts ranging from 5 to 20% by weight, pre-gelatinized starch in amounts ranging from 5 to 20% by weight, and soy protein concentrate in amounts ranging from 2 to 20% by weight and mixing the combination to form a uniform mixture for packaging.

9. A process according to claim 8 wherein the amount of bread crumb oil blend in the composition ranges from 60 to 70% by weight.

10. A process according to claim 8 wherein the amount of oil in the composition ranges from 15 to 24% by weight.

11. A process according to claim 10 wherein the amount of oil in the composition ranges from 17 to 21% by weight.

12. A process according to claim 8 wherein the uniform blend of bread crumb and oil is heated for for a time ranging from 10 to 25 minutes.

13. A process according to claim 8 wherein the uniform blend of bread crumb and oil is heated at about 240° F. to 250° F.

14. A process according to claim 8 wherein the amount of dextrin in the composition ranges from 8% to 12% by weight.

15. A process according to claim 8 wherein the amount of pregelatinized starch in the composition ranges from 9% to 13% by weight.

16. A process according to claim 8 wherein the amount of soy protein concentrate in the composition ranges from 3% to 6% by weight.

17. A process according to claim 8 wherein the heated bread crumb/oil blend comprises about 66% by weight of the total composition.

18. A process for preparing a coating composition which imparts a crisp, golden-brown surface to foods cooked in a microwave appliance comprising:
(a) raising the moisture of the bread crumbs to between about 30% and 40%;
(b) frying the moistened bread crumbs by contacting same with oil having a temperature ranging from 350° F. to 400° F. for a time ranging from 30 seconds to about 2 minutes;
(c) draining the fried crumbs to an oil content ranging from 25 to 30%; and
(d) combining the fried bread crumbs with a mixture comprising dextrin in amounts ranging from 5 to 20% by weight, pre-gelatinized starch in amounts ranging from 5 to 20% by weight, and soy protein concentrate in amounts ranging from 2 to 20% by weight and mixing the combination to form a uniform mixture for packaging.

* * * * *